United States Patent [19]

Spinelli

[11] 3,911,204

[45] Oct. 7, 1975

[54] TELEPHONE ADDRESSED CLOSED CIRCUIT TELEVISION CONVERTER SYSTEM

[75] Inventor: Robert R. Spinelli, North Miami, Fla.

[73] Assignee: K. Gordon Murray, Key Biscayne, Fla.

[22] Filed: June 25, 1973

[21] Appl. No.: 373,502

[52] U.S. Cl. ............ 178/5.1; 178/DIG. 13; 325/53

[51] Int. Cl.$^{2}$ ............ H04N 1/44

[58] Field of Search ............ 178/5.6, 5.8, DIG. 13, 178/DIG. 23, 5.1; 179/2 TV, 1 C, 2 C, 2 A; 325/53, 55, 64, 308, 309, 32, 33, 432

[56] References Cited

UNITED STATES PATENTS

| | | | |
|---|---|---|---|
| 2,573,349 | 10/1951 | Miller et al. | 178/5.1 |
| 2,833,850 | 5/1958 | Bartelink | 178/5.1 |
| 2,882,394 | 5/1959 | Mortley | 325/432 |
| 3,230,302 | 1/1966 | Bruck et al. | 178/5.1 |
| 3,278,677 | 10/1966 | Fannoy | 178/DIG. 13 |
| 3,729,581 | 4/1973 | Anderson | 178/6.8 |

*Primary Examiner*—George H. Libman
*Attorney, Agent, or Firm*—Duckworth, Hobby & Allen

[57] ABSTRACT

Apparatus adapted for use with a television receiver and a telephone instrument includes means for picking up signals into the telephone instrument, and converter means coupled to the pickup means for blocking input signals to the television receiver and for thereafter converting to pass input signals thereto when the pickup means detects signals having predetermined characteristics.

27 Claims, 2 Drawing Figures

TELEPHONE ADDRESSED CLOSED CIRCUIT TELEVISION CONVERTER SYSTEM

BACKGROUND OF THE INVENTION

1. Field of the Invention

The present invention relates to closed circuit television systems, and in particular relates to such systems in which signal inputs to a television receiver may be remotely controlled.

2. Description of the Prior Art

Recently, a specific closed circuit television system has been developed which has primarily found use in the hotel and motel industry. This system employs a video tape playback unit, commonly referred to as a "head-end"unit, to transmit video signals of first run motion pictures onto the master antenna system of the hotel or motel. This service is generally provided on the basis of an additional charge to the room occupant, and such systems therefore require means for alternately blocking and passing these additional video signals depending upon actuation by hotel personnel. In one case each television receiver is provided with a converter circuit operated by a switching circuit associated therewith. The switching circuit is coded to receive a predetermined digital pulse train over the master antenna system and operate the converter circuit to thereafter pass the video signals to the television receiver. At some specified time (generally at an early morning hour) a master signal is ssnt over the antenna system to switch all of the converters into the "block" configuration.

Such systems have at least two distinct disadvantages. First the pulse coding and decoding circuitry heretofore employed in such systems is relatively expensive and greatly adds to the overall cost of the system. Second, the switching circuits presently used pass all of the video signals, which may include signals of as many as four first-run motion pictures. This is undesirable because the room occupant then has access to all of the movies being transmitted. It is desirable to be able to restrict each room occupant's viewing to a limited portion of the transmitted video, i.e., to the one channel the occupant has requested. While the previously described decoding circuits may be designed to accomplish this function, the added cost would be prohibitively expensive.

Other arrangements have also been suggested in the prior art. See, for example, U.S. Pat. Nos. 3,580,989 (and references cited therein) to Banning; 2,833,850 to Barteliak; and 2,769,024, to Del Riccio et al. Other remote circuit control arrangements are taught in the following U.S. Pat. Nos.: 2,810,017 to Tysckiewicz; and 2,554,084 to Favre. In particular, Duncan, in U.S. Pat. No. 3,384,713, teaches a telephone system for remotely controlling a circuit by coded signals transmitted on the telephone circuit.

SUMMARY OF THE INVENTION

The present invention contemplates apparatus adapted for use with a television receiver and a telephone instrument. The apparatus comprises means for picking up signals into the telephone instrument, and converter means coupled to the pickup means and adapted for coupling to the signal input means of the television receiver for altering input signals thereto. The converter means further comprises means for converting to thereafter alter input signals thereto so as to be received by the television receiver when the pickup means picks up a signal having predetermined characteristics.

THE DRAWING

DETAILED DESCRIPTION

Figure 1:
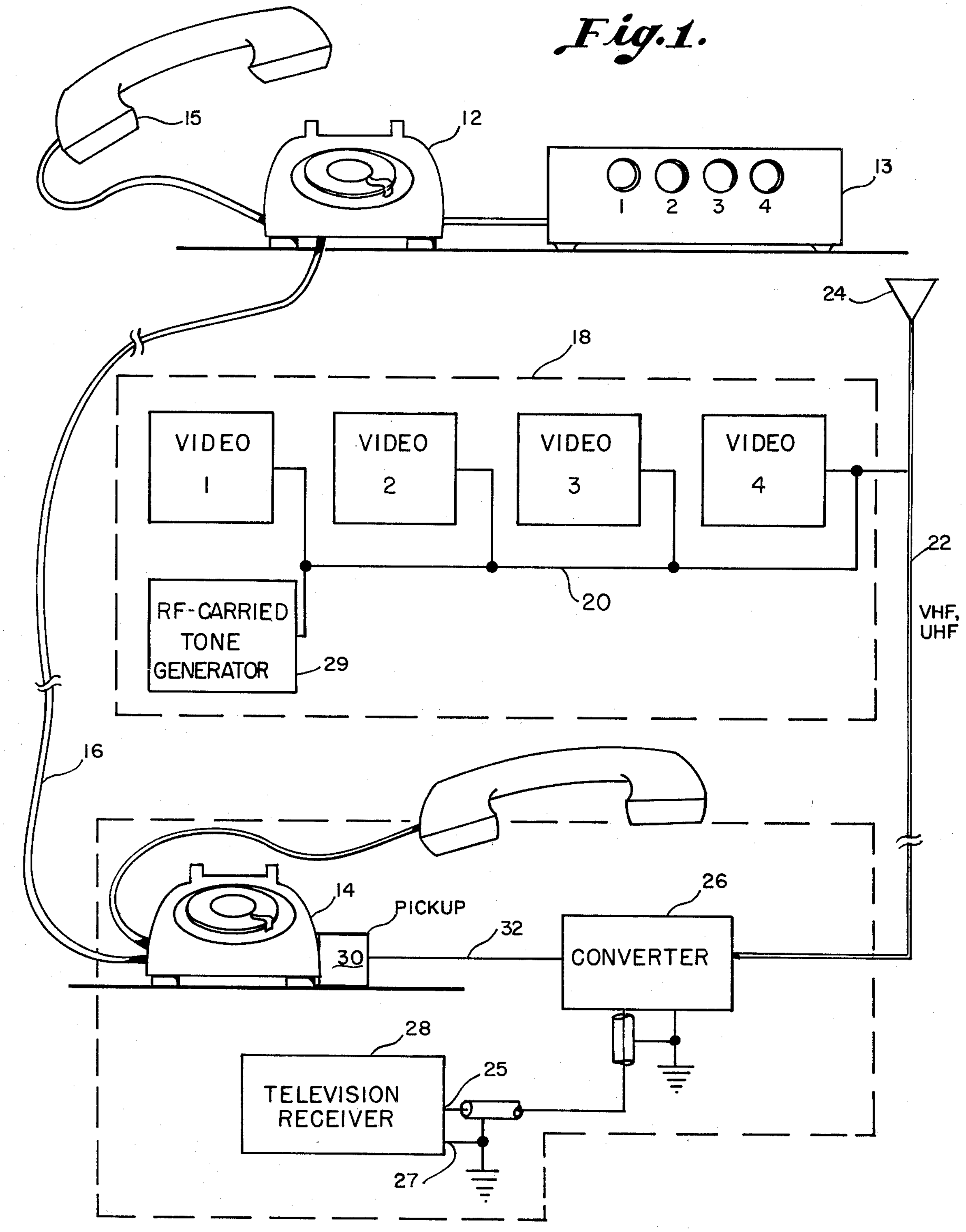
FIG. 1 is a block diagram of various components employed in one embodiment of the system of the present invention.

An emnodiment of the system of the present invention will be described with reference to FIG. 1. In this embodiment the system (referred to generally as 10) is primarily designed for use in hotels, motels, apartment complexes or similar building arrangements, or in conjunction with community antenna television systems having a large number of private subscribers coupled to a common antenna input. For purposes of this description, it is assumed that the system is employed in a hotel having a main telephone instrument 12 (as at the hotel switchboard, for example) and a plurality of room telephones, including the second telephone instrument 14 shown in FIG. 1. The two telephones 12, 14 are capable of electrical interconnection for transmission purposes by a telephone circuit line 16. In this example, the telephone circuit line 16 comprises a private in-hotel line; however, it will be clear to those skilled in the art from the following discussion that the telephone circuit 16 may also comprise standard utility circuits. Coupled to the main telephone instrument 12 is a tone generator 13. The tone generator 13 can be made by well-known techniques, and the particular circuit configuration thereof does not constitute a part of this invention. Preferably, the tone generator 13 includes a plurality (e.g. four channels 1–4) of tone generators each of which is adapted to generate simultaneous multiple audible tones (as two such tones for each channel) into the telephone circuit 16, each tone being of an arbitrarily selected, but different predetermined frequency.

The system 10 further comprises a "head end" 18 of video tape playback units which, in this example, includes four playback units, 1, 2, 3 and 4. The playback units of channels 1–4 may comprise any commercially available video tape player which is adapted to provide an RF output representative of the recorded video and audio information. Since the present system is intended to play motion pictures or similar subject matter of some length, the four channels 1–4 may include subchannels allowing the first half of a movie on, for example one subchannel to be played, and thereafter the second half of the movie to be played through another subchannel, freeing the first subchannel for restarting the first half of that movie. Thus, four two-hour full length motion pictures may be carried respectively on Channels 1–4, and a restart of one of these four movies can occur at the end of about every 15 minute interval.

The output of all of the Channels 1–4 are fed along a circuit line 20 into a master antenna line 22 which, in this example, comprises coaxial cable connected to a standard VHF-UHF television antenna 24 and a plurality of converter circuits 26, each converter being located in a room corresponding to the telephone instrument 14. The converter circuit 26 is described in greater detail with reference to FIG. 2.

Figure 2:
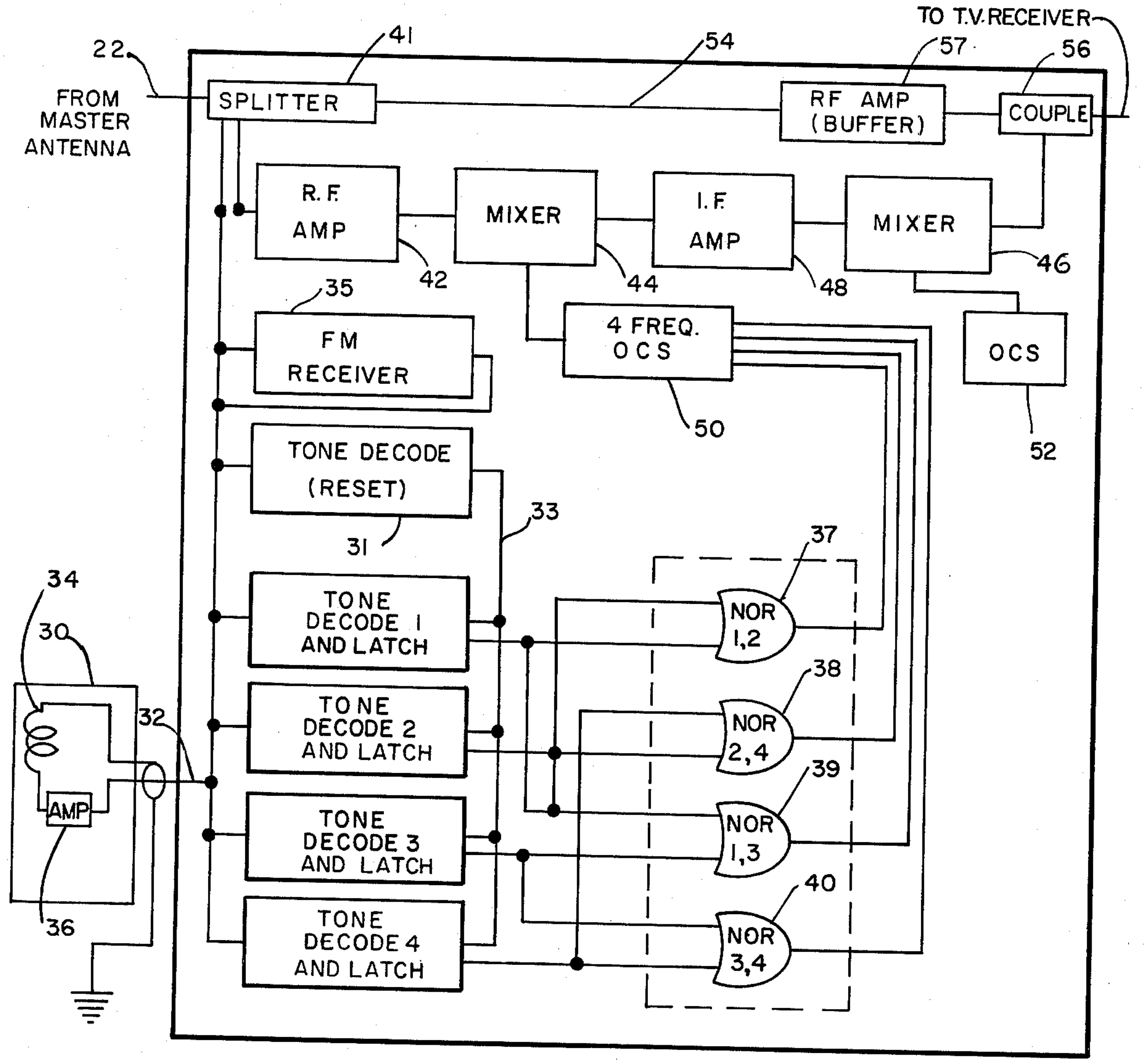
FIG. 2 is a block diagram of a circuit constituting a portion of the embodiment of FIG. 1.

The converter 26 is coaxially coupled to the input signal terminals 25, 27 of a standard television receiver 28 located in the room. A pickup unit 30, also described with reference to FIG. 2, is disposed adjacent to and free of the room telephone 14, and is coupled to the converter 26 via a circuit line 32. In this regard, "adjacent to and free of" is intended to mean that the pickup unit 30 is not physically joined to the telephone instrument 14; however, the pickup unit may rest or be attached against the instrument and be electrically coupled thereto, as by magnetic pickup means hereinafter described.

The system 10 of FIG. 1 operates in the following manner. Initially the head-end unit 18 is provided with appropriate video tapes of, for example, four feature length motion pictures, which will be designated motion pictures 1, 2, 3 and 4 for brevity. Motion picture 1 is played through Channel 1, Motion picture 2 is played through Channel 2, and so forth.

The room occupant then places a telephone call via the telephone instrument 14 to the hotel employee at the main telephone instrument 12. The room occupant then advises the hotel employee that he or she wishes to view one of motion pictures 1, 2, 3 or 4. It is preferable that both parties hang up so that the employee can call the requester's room number for verification, although this is not absolutely necessary. The employee then presses the switch 1, 2, 3 or 4 on the tone generator 13 corresponding to the motion picture requested by the room occupant. The tone generator 13 transmits the simultaneous audible tones of predetermined frequencies into the telephone circuit 16, which are then transmitted to the telephone instrument 14 in the requester's room.

The pickup unit 30 in the room includes a magnetic coil (described below) in close proximity to the side of the receiver portion of the telephone instrument 14 and which is magnetically coupled with the circuitry in the receiver to detect the audible signals emitted by the tone generator 13. Prior to the receipt of the multiple audio tones at the pickup unit 30, all of the signals for Channels 1–4 are not received by the television receiver 28, because these signals are not synchronized with a VHF channel of the receiver, as described below with reference to specific frequencies. When the pickup unit 30 detects audio tones into the telephone 14, the audio signal output from the pickup unit 30 is fed to the converter 26, which decodes the multiple audible tones and thereafter alters the radio frequency signal from one of the Channels 1–4 which corresponds to the channel selection made at the tone generator 13. A radio frequency signal corresponding to the selected channel 1–4 is then received by the television receiver 28 allowing the room occupant to view only one motion picture on a predetermined VHF channel of the receiver.

A specific embodiment of the circuit arrangement for the pickup unit 30 and the converter circuit 26 is shown in FIG. 2 and described with reference thereto.

The pickup unit 30 comprises a magnetic coil 34 and a standard audio amplifier 36 coupled in series with each other and the circuit line 32. Circuit line 32 is coupled to the input terminals of four tone decoder and latching circuits 1, 2, 3 and 4 in the converter 26. The circuit line 32 is also coupled to a reset tone decoder 31. The tone decoder and latching circuits 1 through 4 may comprise commercially available integrated circuits, such as the Signetics 567 Tone Decoder phase-locked loop device, for example. This device is designed to latch into conduction when the corresponding tone is detected, and thereafter unlatch upon application of an appropriate bias signal, such as an increase in positive bias. In this example, an unlatching bias signal is applied to the tone decoder and latching circuits 1–4 from the reset decoder 31 via circuit line 33.

Four standard gate circuits 37, 38, 39 and 40 are coupled to the outputs of the tone decoder and latching circuits 1 through 4 as set forth in legend in FIG. 2; that is NOR gate 37 is coupled to the output of the tone decoder and latching circuits 1 and 2, NOR gate 38 is coupled to the output of tone decoder circuits 2 and 4, and so forth. Each tone decoder and latching circuit 1–4 is preselected to detect the presence of a single audible tone and provide an output into the corresponding NOR gate 37–40 when such is detected. Each NOR gate 37–40, upon receiving an input from the corresponding two of the tone decoder and latching circuits 1 through 4, operates to provide an output in a well known manner.

Noting the upper portion of the converter 26 in FIG. 2, the converter further comprises means for altering input signals from the master antenna line 22 so that such signals will be receivable by a preselected VHF channel of the television receiver 18. This means includes a radio frequency amplifier circuit 42 coupled to the master antenna-circuit 22 through an RF splitter 41 and to a mixer circuit 44 which is, in turn coupled to a second mixer circuit 46 through an intermediate frequency amplifier stage 48. A four-frequency oscillator 50 is coupled to the first mixer stage 44, and includes four input terminals each coupled to the output of one of the NOR gates 37–40. A beat frequency oscillator 52 is coupled to the second mixer stage 46. An internal circuit line 54 extends between the input of circuit line 22 through the splitter 41 at the radio frequency amplifier 42 and to a coupler 56 at the output of the second mixer stage 46. An RF buffer amplifier 57 is interposed along the circuit line 54 to provide isolation between the input and output of the converter 26.

In operation, the tone decoder circuits 1 through 4 analyze the tone pulses fed thereto from the pulse unit 30, and when a corresponding NOR gate 37–40 is operated by an input from two tone decoder circuits, the NOR gate keys the corresponding frequency of the four frequency oscillator 50. Previous to the keying of one of the frequencies of oscillator 50, the video RF signal from the head-end channels 1–4 is blocked at the television receiver 28 (via circuit line 54) because the frequencies thereof are not synchronized with any VHF channel of the receiver. (Normal VHF-UHF signals are, however, passed into the receiver 28). When one of the frequencies of the four frequency oscillator 50 begins running, that frequency mixes with all of the radio frequencies of channels 1–4, and passes the mixed frequencies into the IF amplifier 48. The IF amplifier 48 amplifies and passes only one of the mixed frequencies corresponding to the selected channel to the second mixer 46, where that intermediate frequency is mixed with a frequency from the frequency oscillator 52 to derive an output thereof corresponding to a predetermined VHF channel selection on the television receiver 28.

By way of example, the four head-end channels 1–4 may be selected to transmit on standard CATV sub-channel frequencies of 15.75 MHz, 21.75 MHz, 27.75 MHz, and 33.75 MHz, respectively. The four frequencies of the oscillator 50 may be selected at 19.25 MHz, 26.75 MHz, and 32.75 MHz and 38.25 MHz, respectively. The resulting intermediate frequency combination will always be a standard television IF of 4.5 MHz. The output of the converter 26 may be arbitrarily designated to be presented on any one of the VHF channels of the television receiver 28, for example, Channel Three, which has a standard carrier frequency of 61.25 MHz.

The frequency of the oscillator 52 is then selected at 65.75 MHz, such that the output of the mixer 46 is the 61.25 MHz of Channel Three on the television receiver 28.

The synchronized video of the second mixer stage 46 to the input terminals 25, 27 of the receiver 28 through the coupler 56. In this way the audible tones generated at the main telephone instrument 12 determine a single channel from the head-end unit 18 to which the room occupant has access.

The manner in which the decoder and latching circuits 1–4 are reset will now be described. As shown in FIG. 2, the converter 26 also includes an FM receiver 35 coupled to the master antenna line 22 through the RF splitter 41, and to the reset tone decode circuit 31. At an appropriate time, such as an early morning hour, an RF-carried audio tone is sent along the master antenna line 22 into the FM receiver 35, as by an RF carrier-tone generator 29, for example, co-located with the head-end unit 18. The audio tone is thence passed into the reset decoder 31. When an appropriate tone is received, the reset decoder 31 unlatches the tone decoder and latching circuits 1–4. Alternatively, the original channel multiple tones may be RF- carried to the tone decoder and latching circuits 1–4 to thereby energize the system, as previously described.

In yet another alternative arrangement, the reset tone may be transmitted by the tone generator 13 prior to transmission of the multiple audio tones. In this manner, the reset decoder 31 can unlatch the tone decoder and latching circuits 1–4 just prior to energization of one of these circuits by the multiple tones.

I claim:

1. Apparatus adapted for use with a television receiver and a telephone instrument co-located with said television receiver comprising: means for picking up predetermined coding signals received into said telephone instrument; and a converter having inputs coupled to receive signals from said pickup means and from multiple television signals having carrier frequencies which are not receivable by said television receiver, said converter comprising means for converting any selected one of said multiple television signals to a frequency which is compatible with a channel of said television receiver only subsequent to receipt by said pickup means of a predetermined coding signal corresponding to the selected television signal.

2. Apparatus as recited in claim 1 wherein said converter means further comprises means for decoding outputs of said pickup means.

3. Apparatus as recited in claim 2 wherein said pickup means comprises means for picking up electrical signals representative of audible signals received by said telephone instrument.

4. Apparatus as recited in Claim 3 wherein said pickup means comprises means inductively coupled to said telephone instrument.

5. Apparatus as recited in claim 3 wherein said telephone instrument is of a type comprising a receiver, and wherein said pickup means is disposed adjacent to and free of said receiver.

6. Apparatus as recited in claim 5 wherein said pickup means comprises inductive coupling means picking up said signals into said telephone receiver.

7. Apparatus as recited in claim 6 wherein said inductive coupling means comprises a pickup coil adapted to be justaposed next adjacent said telephone receiver.

8. Apparatus as recited in claim 3 wherein said decoding means comprises a tone decoder circuit coupled to said pickup means, and adapted to provide an output when an input from said pickup means is representative of an audible tone into said telephone instrument.

9. Apparatus as recited in claim 8 wherein said tone decoder circuit further comprises means for latching said tone decoder circuit when said tone is received.

10. Apparatus as recited in claim 9 further comprising means for unlatching said latching means.

11. Apparatus as recited in claim 10 further comprising:

a plurality of decoder circuits, each adapted to provide an output only upon receiving an input from said pickup means at a predetermined frequency; and a plurality of gating means coupled on at least two of said decoder circuits and adapted to provide an output only when an input is received from all of the decoder circuits coupled thereto.

12. Apparatus as recited in claim 11 further comprising plural frequency oscillating means coupled to said gating means and adapted to oscillate at different frequencies, each frequency being keyed by a different one of said decode r circuits through the corresponding one of said gating means.

13. Apparatus as recited in claim 12 wherein said tone decoder circuits further comprise means coupled to said input signal line and said tone decoder circuit for resetting said tone decoder circuits.

14. Apparatus as recited in claim 13 wherein said resetting means comprises tone decoding means coupled to said input signal line.

15. Apparatus as recited in claim 14 wherein said resetting means comprises said means for unlatching said latching means.

16. Apparatus as recited in claim 15 further comprising said resetting means coupled to said pickup means.

17. Apparatus as recited in claim 16 further comprising a mixer circuit coupled to said plural frequency oscillating means and interposed between said signal input means of said telephone receiver and an input signal line thereto.

18. Apparatus as recited in claim 17 further comprising:

an intermediate frequency circuit coupled to said mixer circuit;

another mixer circuit coupled to said intermediate frequency circuit, and to said input signal means of said television receiver; and an oscillator circuit coupled to said another mixer circuit.

19. A system adapted for use with a co-located television receiver and a telephone instrument comprising:

means for generating predetermined coding signals along a telephone circuit line into said telephone instrument;

means adapted to be disposed adjacent to and free of said telephone instrument for picking up said signals;

video playback means for providing multiple television signals having carrier frequencies which are not receivable by said television receiver; and a converter having inputs coupled to receive signals from said pickup means and said multiple television signals, said converter comprising means for converting any selected one of said multiple television signals to a frequency which is compatible with a channel of said television receiver only subsequent to receipt by said pickup means of a predetermined coding signal corresponding to the selected television signal.

20. A system as recited in claim 19 wherein said generating means comprises a tone generator adapted to transmit multiple audible tones along said telephone circuit.

21. A system as recited in claim 19 wherein said signal pickup means comprises a coil inductively coupled with said telephone instrument and adapted to pick up said audible signals.

22. A system as recited in claim 19 wherein said converter means comprises:

a plurality of tone decoder and latching circuits coupled with said signal pickup means, each said tone decoder and latching circuit adapted to decode audible signals of a given frequency and thereafter latch into conduction;

a plurality of gating circuits, each gating circuit coupled to at least two of said tone decoder and latching circuits and adapted to conduct only upon receiving an input from all of the tone decoder and latching circuits coupled thereto; and means coupled to said gating circuits, said input signal line and said television receiver for altering signals from said video playback means so as to be receivable by said preselected channel of said receiver.

23. A system as recited in claim 22 wherein said signal altering means comprises:

plural frequency oscillation means coupled with said gating circuits and adapted to oscillate at a different predetermined frequency upon receiving an input from a different one of said gating circuits; and a mixer circuit coupled with said plural frequency oscillation means along said input signal line between said video playback means and said television receiver for mixing radio frequency signals from said video playback means with outputs from said plural frequency oscillation means.

24. A system as recited in claim 23 further comprising:

an intermediate frequency amplifier coupled to said mixer circuit;

a second mixer circuit coupled with said intermediate frequency amplifiers;

a single frequency oscillator coupled with said second mixer circuit; and wherein an output from said signal altering means comprises a radio frequency signal receivable by said preselected channel.

25. A system as recited in claim 22 further comprising a tone decode and reset circuit coupled to all of said tone decoder and latching circuits and said pickup means, and adapted to unlatch said tone decoder and latching circuits upon receiving an appropriate reset signal from said pickup means.

26. A system as recited in claim 22 wherein said converter means further comprises:

a reset circuit coupled to, and adapted to unlatch all of said tone decoder latching circuits upon receiving a reset signal;

a radio frequency receiver coupled to said input signal line and said reset circuit for receiving a radio frequency signal modulated by said reset circuit; and means coupled to said input signal line for generating said reset signal modulated radio frequency signal.

27. A system as recited in claim 26 further comprising said reset circuit coupled to said pickup means and adapted to receive said reset signal therefrom.

* * * * *